United States Patent [19]

Nagai et al.

[11] Patent Number: 4,698,182

[45] Date of Patent: Oct. 6, 1987

[54] HEXAGONAL PLATE-LIKE BARIUM FERRITE PARTICLES FOR MAGNETIC RECORDING AND PROCESS FOR PRODUCING THE SAME

[75] Inventors: Norimichi Nagai; Nanao Horiishi, both of Niroshima; Masao Kiyama; Toshio Takada, both of Kyoto, all of Japan

[73] Assignee: Toda Kogyo Corp., Japan

[21] Appl. No.: 654,194

[22] Filed: Sep. 24, 1984

[30] Foreign Application Priority Data

Oct. 12, 1983 [JP] Japan ............................ 58-191556

[51] Int. Cl.$^4$ ............................................. C04B 35/26
[52] U.S. Cl. ............................ 252/62.59; 252/62.56; 252/62.62; 252/62.63
[58] Field of Search ............... 252/62.56, 62.59, 62.63, 252/62.62

[56] References Cited

U.S. PATENT DOCUMENTS

| | | | |
|---|---|---|---|
| 4,309,459 | 1/1982 | Tokuoka | 252/62.59 |
| 4,341,648 | 7/1982 | Kubo et al. | 252/62.59 X |
| 4,414,124 | 11/1983 | Endo et al. | 252/62.59 X |

FOREIGN PATENT DOCUMENTS

| | | | |
|---|---|---|---|
| 57-56904 | 4/1982 | Japan | 252/62.63 |
| 57-198604 | 12/1982 | Japan | 252/62.63 |
| 58-56303 | 4/1983 | Japan | 252/62.63 |

*Primary Examiner*—Jack Cooper
*Attorney, Agent, or Firm*—Lyon & Lyon

[57] ABSTRACT

Disclosed herein are hexagonal plate-like barium ferrite particles for magnetic recording, represented by the formula: $BaFe_{12-x-y}M_xTi_yO_{19}$ wherein x and y are independently 0.6 to 1.2 and M is Co(II) or Co(II) and a divalent metal other than Co, having the width of the particle of 0.1 to 0.4 micrometer and a BET specific surface area (S) of 20 to 50 $m^2/g$, and showing a magnetization (M) of larger than 40 emu/g in a magnetic field of 10 KOe and a coercive force (Hc) of 500 to 1000 Oe, and a process for producing the same.

15 Claims, 8 Drawing Figures

HEXAGONAL PLATE-LIKE BARIUM FERRITE PARTICLES FOR MAGNETIC RECORDING AND PROCESS FOR PRODUCING THE SAME

BACKGROUND OF THE INVENTION

The present invention relates to hexagonal plate-like barium ferrite particles for use in magnetic recording, obtained by substituting a part of Fe(III) in plate-like barium ferrite particles with Ti(IV) and Co(II) or Co(II) and a divalent metal other than Co such as Fe(II), Mn(II) and Zn(II), and a process for producing the same.

In more detail, the present invention relates to hexagonal plate-like barium ferrite particles for magnetic recording, represented by the formula: $BaFe_{12-x-y}M_xTi_yO_{19}$ wherein x and y are independently 0.6 to 1.2 and M is Co(II) or Co(II) and a divalent metal other than Co, having the width of the particle of 0.1 to 0.4 micrometer and a BET specific surface area (S) of 20 to 50 m²/g, and showing a magnetization (M) of larger than 40 emu/g in a magnetic field of 10 KOe and a coercive force (Hc) of 500 to 1000 Oe, and a process for producing hexagonal plate-like barium ferrite particles for magnetic recording, represented by the formula: $BaFe_{12-x-y}M_xTi_yO_{19}$ wherein x and y are independently 0.6 to 1.2 and M is Co(II) or Co(II) and a divalent metal other than Co, which comprises autoclaving an aqueous highly alkaline suspension of ferric hydroxide containing Ti(IV), Ba(II) and Co(II) or Co(II) and the divalent metal other than Co as M(II) at a temperature in the range of 250° to 330° C., treating the thus obtained particles with an aqueous solution containing Si(IV), and subjecting the thus treated particles to thermal treatment at a temperature of not more than 900° C.

In recent years, accompanying with the propagation of VTR, audio component, word processer and computer, non-acicular ferromagnetic particles of a favorable dispersibility provided with a suitable coercive force (Hc) and a large magnetization (M) have been required as the magnetic material for recording, particularly as the magnetic material for the perpendicular magnetic recording.

In general, as a method for producing barium ferrite particles, a method of heat-treating an aqueous alkaline suspension containing Ba(II) and Fe(III) in an autoclave as a reactor (the method is hereinafter referred to as "the autoclaving method") has been known, and by selecting the reacticn conditions in the autoclaving method, barium ferrite particles precipitate. The thus precipitated particles are hexagonal plate-like, and the distribution of the particle size and the average size of the particles differ according to the reaction conditions. In result, the particles differ in their properties.

The present inventors found that hexagonal plate-like barium ferrite particles represented by the formula: $BaFe_{12-x-y}M_xTi_yO_{19}$ wherein x and y are independently 0.6 to 1.2 and M is Co(II) or Co(II) and a divalent metal other than Co such as Zn(II), Mn(II) and Fe(II), were produced by autoclaving an aqueous highly alkaline suspension of ferric hydroxide containing Ti(IV), Ba(II) and as M(II), Co(II) or Co(II) and the divalent metal other than Co such as Fe(II), Zn(II) and Mn(II).

However, in the case where M(II) is Co(II), in the obtained hexagonal plate-like barium ferrite particles represented by the formula: $BaFe_{12-x-y}Co_xTi_yO_{19}$ wherein x and y are as defined above, x becomes larger, the coercive force (Hc) thereof becomes smaller. The coercive force (Hc) of the hexagonal plate-like barium ferrite particles is 100 Oe, when x is 1.2. Also, a magnetization (M) of the hexagonal plate-like barium ferrite particles in a magnetic field of 10 KOe is less than 40 emu/g, when x is larger than 0.3.

In the case where M(II) denotes Co(II) and divalent metal such as Fe(II), Zn(II) and Mn(II), a magnetization (M) of the hexagonal plate-like barium ferrite particles in a magnetic field of 10 KOe slightly changes by a kind and amount of the divalent metal.

As a result of the present inventors' study for improving the magnetization (M) in a magnetic field of 10 KOe of the hexagonal plate-like barium ferrite particles represented by the by the formula: $BaFe_{12-x-y}M_xTi_yO_{19}$ wherein x,y and m are as defined above, it has been found that the thermal treatment of the particles obtained by autoclaving method formed a hexagonal plate-like barium ferrite particles showing the high magnetization (M) without remarkably changing the shape of the particle as well as a BET specific surface area (S), and based on the finding, the present invention has been attained.

SUMMARY OF THE INVENTION

In the first aspect of the present invention, there is provided hexagonal plate-like barium ferrite particles for magnetic recording, represented by the formula: $BaFe_{12-x-y}M_xTi_yO_{19}$ wherein x and y are independently 0.6 to 1.2 and M is Co(II) or Co(II) and a divalent metal other than Co, having the width of the particle of 0.1 to 0.4 micrometer and a BET specific surface area (S) of 20 to 50 m²/g, and showing a magnetization (M) of larger than 40 emu/g in a magnetic field of 10 KOe and a coercive force (Hc) of 500 to 1000 Oe.

In the second aspect of the present invention, there is provided a process for producing hexagonal plate-like barium ferrite particles for magnetic recording, represented by the formula: $BaFe_{12-x-y}M_xTi_yO_{19}$ wherein x and y are independently 0.6 to 1.2 and M is Co(II) or Co(II) and a divalent metal other than Co, which comprises autoclaving an aqueous highly alkaline suspension of ferric hydroxide containing Ti(IV), Ba(II) and Co(II) or Co(II) and the divalent metal other than Co as M(II) at a temperature in the range of 250° to 330° C., treating the thus obtained particles with an aqueous solution containing Si(IV), and subjecting the thus treated particles to thermal treatment at a temperature of not more than 900° C.

In the third aspect of the present invention, there is provided hexagonal plate-like barium ferrite particles for magnetic recording, represented by the formula: $BaFe_{12-x-y}M_xTi_yO_{19}$ wherein x and y are independently 0.6 to 1.2 and M is Co(II) or Co(II) and a divalent metal other than Co, having the width of the particle of 0.1 to 0.4 micrometer and a BET specific surface area (S) of 20 to 50 m²/g, and showing a magnetization (M) of larger than 40 emu/g in a magnetic field of 10 KOe and a coercive force (Hc) of 500 to 1000 Oe, produced by autoclaving an aqueous highly alkaline suspension of ferric hydroxide containing Ti(IV), Ba(II) and Co(II) or Co(II) and the divalent metal other than Co as M(II) at a temperature in the range of from 250° to 330° C., thereby obtaining hexagonal platelike particles represented by the formula: $BaFe_{12-x-y}M_xTi_yO_{19}$ wherein x, y and M are as defined above, having the width of the particle of 0.05 to 0.4 micrometer, treating the thus obtained particles with an aqueous solution containing Si(IV), and subjecting the thus treated particles to thermal treatment at a temperature of not more than 900° C.

BRIEF EXPLANATION OF DRAWINGS

Of the attached drawings,

FIG. 3 shows the dependency of BET specific surface area (s) of the hexagonal plate-like barium ferrite particles obtained by the thermal treatment of the particles of $BaFe_{10.5}Co_{0.75}Ti_{0.75}O_{19}$, at the temperature of the thermal treatment in the following two cases:

(1) the particles were subjected to Si(IV)-treatment before the thermal treatment, and (2) the particles were not subjected to Si(IV)-treatment before the thermal treatment.

DETAILED DESCRIPTION OF THE INVENTION

Hexagonal plate-like barium ferrite particles according to the present invention, represented by the formula: $BaFe_{12-x-y}M_xTi_yO_{19}$ wherein x and y are independently 0.6 to 1.2 and preferably x is equal to y, and M is Co(II) or Co(II) and a divalent metal other than Co, having the width of the particle of 0.1 to 0.4 micrometer and a BET specific surface area (S) of 20 to 50 $m^2/g$, and showing a magnetization (M) of larger than 40 emu/g in a magnetic field of 10 KOe and a coercive force (Hc) of 500 to 1000 Oe, are produced by the process comprising autoclaving an aqueous highly alkaline suspension of ferric hydroxide containing Ti(IV), Ba(II) and Co(II) or Co(II) and the divalent metal other than Co as M(II) at a temperature in the range of 250° to 330° C., treating the thus obtained particles with an aqueous solution containing Si(IV), and subjecting the thus treated particles to thermal treatment at a temperature of not more than 900° C.

In more detail, according to the process of the present invention, the aqueous highly alkaline suspension of ferric hydroxide containing Ti(IV), Ba(II) and Co(II) or Co(II) and the divalent metal other than Co as M(II) wherein the atomic ratio of total sum of M(II) and Ti(IV) to Fe(III) is 0.11:1 to 0.25:1, the atomic amount of M(II) is the same as that of Ti(IV) is autoclaved at a temperature in the range of from 250° to 330° C., preferably 260° to 300° C., thereby obtaining hexagonal plate-like particles represented by the formula: $BaFe_{12-x-y}M_xTi_yO_{19}$ wherein x, y and M are as defined above, having the width of the particle of 0.05 to 0.4 micrometer, and after treating the thus obtained particles with an aqueous solution containing Si(IV), the thus treated particles are subjected to thermal treatment at a temperature of not more than 900° C., preferably 700° to 850° C.

The hexagonal plate-like barium ferrite particles according to the present invention, represented by the formula: $BaFe_{12-x-y}M_xTi_yO_{19}$ wherein x, y and M are as defined above, have the width of the particle of 0.1 to 0.4 micrometer, preferably 0.1 to 0.3 micrometer and the BET specific surface area (S) of 20 to 50 $m^2/g$, preferably 30 to 40 $m^2/g$, and show the magnetization (M) of larger than 40 emu/g, preferably larger than 45 emu/g in a magnetic field of 10 KOe and the coercive force (Hc) of 500 to 1000 Oe, preferably 600 to 900 Oe.

As Fe(III) in the present invention, ferric chloride, ferric nitrate and powdery ferric oxyhydroxide may be used.

As Ba(II) in the present invention, barium hydroxide, barium nitrate and barium chloride may be used.

As Co(II) in the present invention, cobalt nitrate and cobalt chloride may be used, and as Ti(IV) in the present invention, titanium chloride and alkali titanate may be used.

As Fe(II) in the present invention, ferrous chloride and ferrous nitrate may be used, as Zn(II) in the present invention, zinc chloride and zinc nitrate may be used and as Mn(II) in the present invention, manganese chloride and manganese nitrate may be used.

The autoclaving treatment of the present invention may be carried out at any temperature which is lower than the critical temperature of the aqueous solution, and particularly the reaction temperature of 250° to 330° C. is suitable for an economic production of the ferrite.

The following is the explanation of the representative examples of the numerous experiments carried out by the present inventors.

Figure 1:
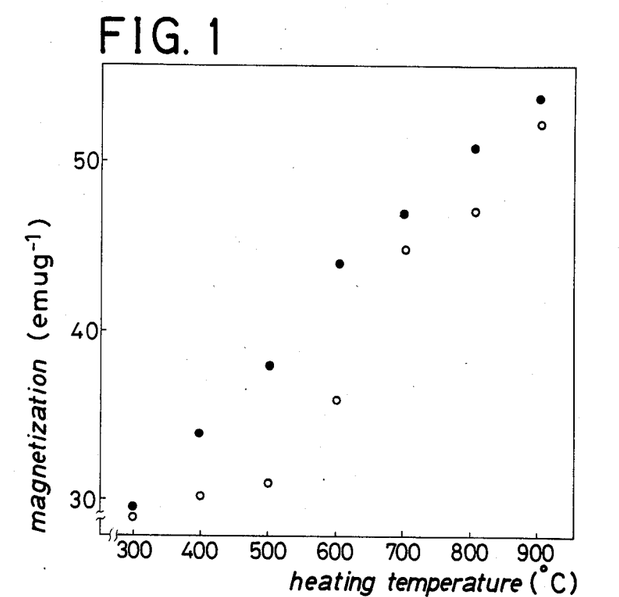
FIGS. 1 and 2 respectively show the diagrams obtained by plotting magnetization (M) and coercive force (Hc) of the hexagonal plate-like barium ferrite particles obtained by the thermal treatment of the particles of $BaFe_{10.8}Co_{0.6}Ti_{0.6}O_{19}$ and $BaFe_{9.8}Co_{1.1}Ti_{1.1}O_{19}$, respectively in a range of from 300° to 900° C. in air for 2 hours against the each temperature of the thermal treatment, and in the figures, the mark: ○ shows the values of the hexagonal plate-like barium ferrite particles obtained from $BaFe_{10.8}Co_{0.6}Ti_{0.6}O_{19}$ and the mark: ● shows the values of the hexagonal plate-like barium ferrite particles obtained from $BaFe_{9.8}Co_{1.1}Ti_{1.1}O_{19}$.
Figure 2:
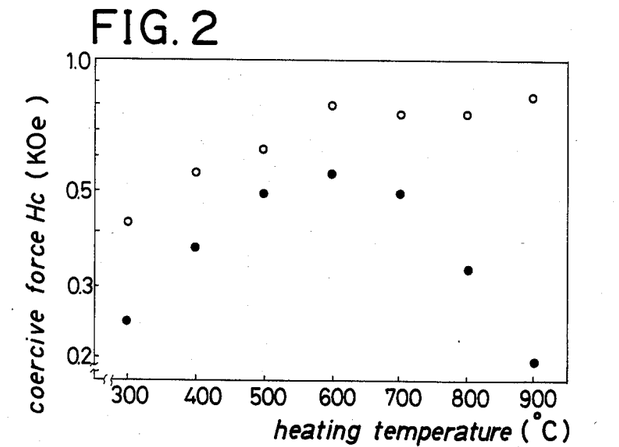

FIGS. 1 and 2 respectively show the relationship between magnetization (M) of hexagonal plate-like barium ferrite particles and the temperature of thermal treatment and the relationship between coercive force (Hc) of hexagonal plate-like barium ferrite particles and the temperature of thermal treatment of the two representative specimens, $BaFe_{10.8}Co_{0.6}Ti_{0.6}O_{19}$ and $BaFe_{9.8}Co_{1.1}Ti_{1.1}O_{19}$, both of which are obtained by autoclaving method, the thermal treatment being carried out at a temperature in the range of 300° to 900° C. in air 2 hours.

In FIGS. 1 and 2, the mark: ○ shows the values of the specimen, $BaFe_{10.8}Co_{0.6}Ti_{0.6}O_{19}$ and the mark: ● shows the values of the specimen, $BaFe_{9.8}Co_{1.1}Ti_{1.1}O_{19}$.

In a separate experiment, the specimen obtained by autoclaving method was treated by an aqueous acetic acid solution containing 4% by weight of Si(IV), and then the thus treated specimen was subjected to the thermal treatment in the same conditions as above. As a result, it was found that the progress of sintering of the particles of the specimen due to the thermal treatment at a temperature of higher than 700° C. was remarkably hindered by the presence of Si(IV), although the magnetic properties of the specimen subjected to the thermal treatment at the each temperature of thermal treatment were not remarkably different from those of specimen subjected to the thermal treatment without being subjected to Si(IV)-treatment.

Figure 3:
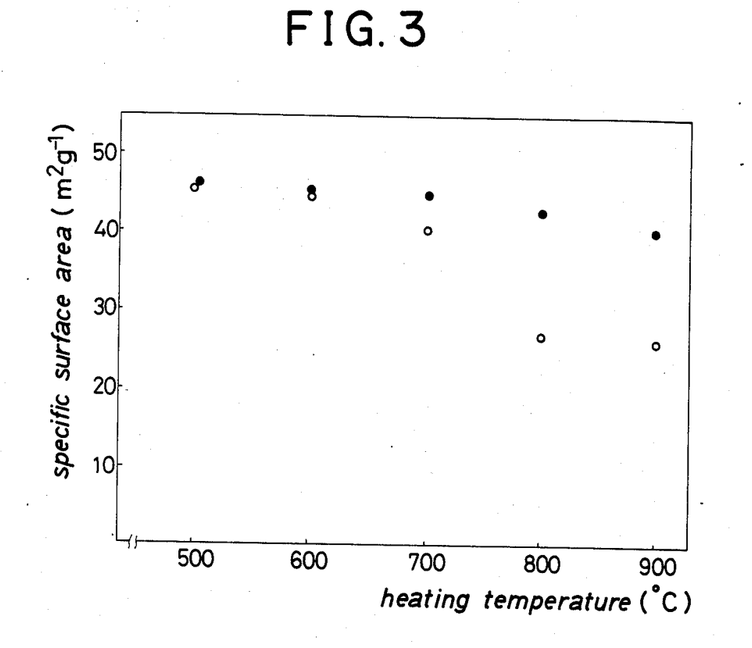

FIG. 3 shows the dependency of BET specific surface area (S) of hexagonal plate-like barium ferrite particles obtained by the thermal treatment of the specimen of $BaFe_{10.5}Co_{0.75}Ti_{0.75}O_{19}$ as a representative example on each temperature of the thermal treatment in the following two cases:

(1) the specimen was subjected to Si(IV)-treatment before the thermal treatment, and (2) the specimen was not subjected to Si(IV)-treatment before the thermal treatment.

In FIG. 3, the mark: ○ shows the BET specific surface area (S) when Si(IV)-treatment was not carried out before thermal treatment and the mark: ● shows the BET specific surface area (S) when Si(IV)-treatment was carried out.

According to the results of electronmicroscopic observation, the shape and the size of the particle subjected to thermal treatment at a temperature of lower than 700° C. were not so much different from those of the particle before the thermal treatment regardless of the Si(IV)-treatment, however, in the case of thermal treatment at a temperature of 700° C. or more than 700° C., the BET specific surface area (S) of the particles subjected to thermal treatment without being subjected to Si(IV)-treatment became smaller than that before thermal treatment, due to the mutual sintering of the particles during the thermal treatment.

Figure 4:
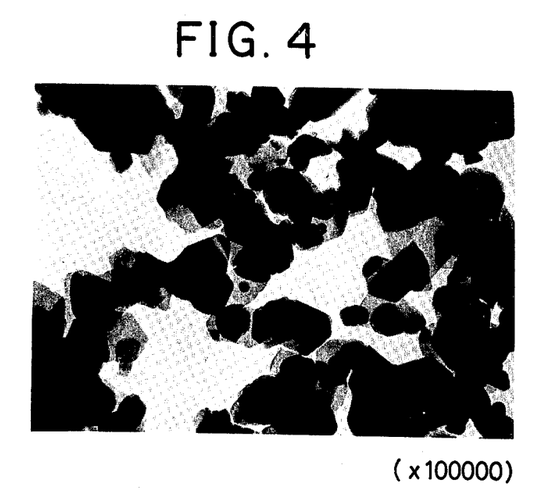
FIGS. 4 and 5 are electronmicrographs (×100,000) of hexagonal plate-like barium ferrite particles obtained by the thermal treatment of the particles at 800° C. The electronmicrograph in FIG. 4 shows the hexagonal plate-like barium ferrite particles obtained by the thermal treatment without being subjected to Si(IV)-treatment, and the electronmicrograph in FIG. 5 shows the hexagonal plate-like barium ferrite particles obtained by the thermal treatment after being subjected to Si(IV)-treatment.
Figure 5:
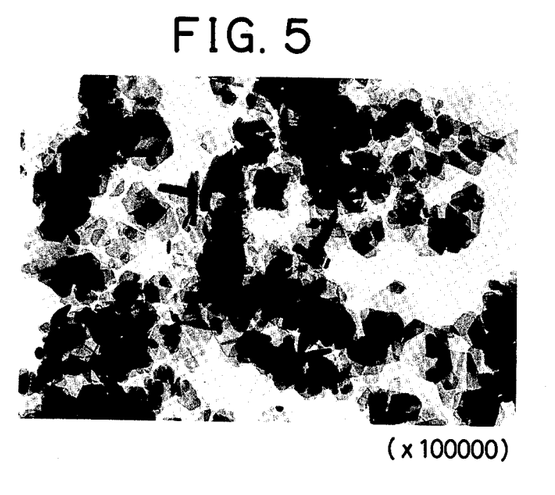

FIGS. 4 and 5 are the electronmicrographs (×100,000) of hexagonal plate-like barium ferrite particles obtained by thermal treatment at 800° C. of the particles produced by autoclaving method, and FIG. 4 is that of the hexagonal plate-like barium ferrite particles subjected to the thermal treatment without having been subjected to Si(IV)-treatment and FIG. 5 is that of the hexagonal plate-like barium ferrite particles subjected to thermal treatment after being subjected to Si(IV)-treatment.

Figure 6:
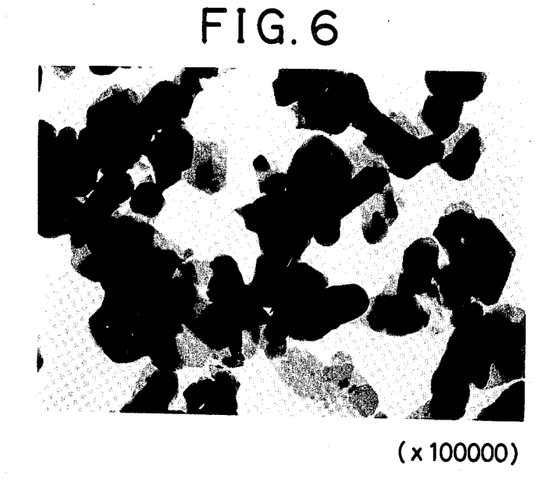
FIGS. 6 and 7 are electronmicrographs (×100,000) of hexagonal plate-like barium ferrite particles obtained by the thermal treatment of the particles at 900° C. The electronmicrograph in FIG. 6 shows the hexagonal plate-like barium ferrite particles obtained by the thermal treatment without being subjected to Si(IV)-treatment, and the electronmicrograph in FIG. 7 shows the hexagonal plate-like barium ferrite particles obtained by the thermal treatment after being subject to Si(IV)-treatment.
Figure 7:
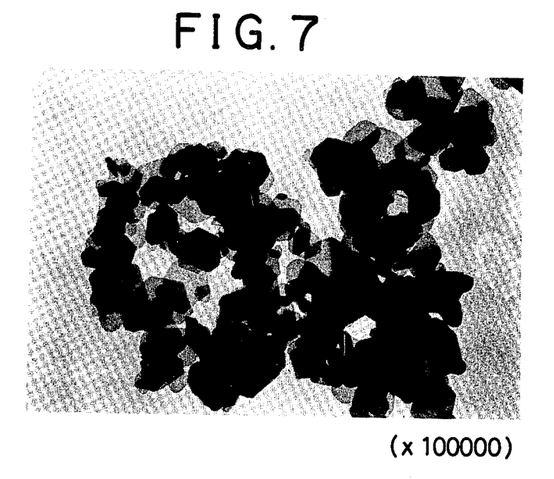

FIGS. 6 and 7 are also the electronmicrographs (×100,000) of hexagonal plate-like barium ferrite particles obtained by thermal treatment at 900° C. of the particles obtained by autoclaving method, and FIG. 6 is that of the hexagonal plate-like barium ferrite particles subjected to thermal treatment without having been subjected to Si(IV)-treatment, and FIG. 7 is that of the hexagonal plate-like barium ferrite particles subjected to the thermal treatment after being subjected to Si(IV)-treatment.

As are seen in FIGS. 6 and 7, the growth and the mutual sintering of the particles during the thermal treatment at a temperature as high as 900° C. are remarkably hindered in the case where the particles obtained by autoclaving method have been subjected to Si(IV)-treatment before the thermal treatment.

Although the temperature at which the sintering of the particles begins, depends on the kind of atmosphere, the concentration of Si(IV) in the treating solution and the amount of adsorbed Si(IV) onto the particles, which depends on pH of the treating solution, the mutual sintering of the particles begins at a temperature of more than 900° C. Accordingly, the thermal treatment of the particles is to be carried out at a temperature of 900° C. or lower than 900° C.

Figure 8:
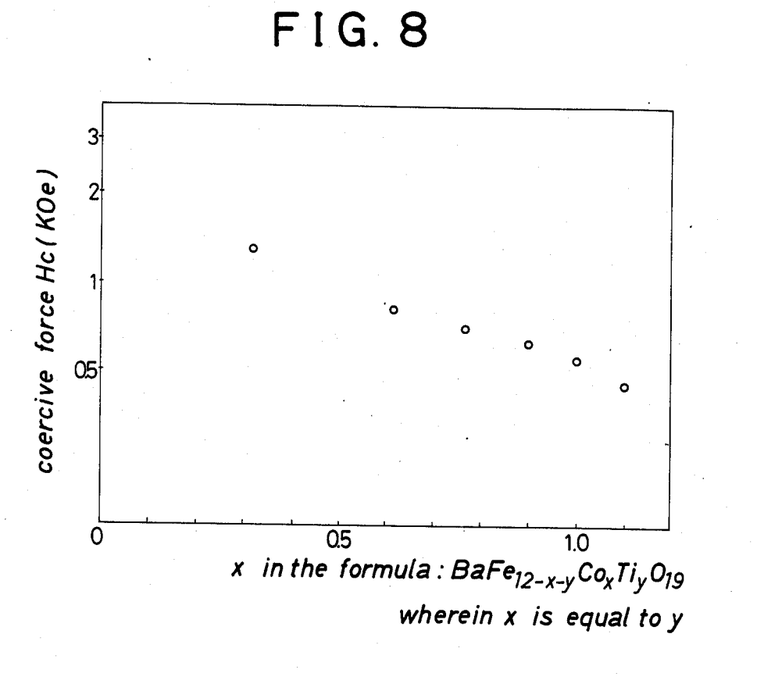
FIG. 8 shows the diagram obtained by plotting coercive force (Hc) of the hexagonal plate-like barium ferrite particles obtained by the thermal treatment of the particles of $BaFe_{12-x-y}Co_xTi_yO_{19}$ in air at 600° C. for 2 hours against the value of x, the hexagonal plate-like barium ferrite particles obtained by the thermal treatment showing BET specific surface area (S) of 30 to 50 $m^2/g$ and magnetization (M) of 43 to 45 emu/g.

FIG. 8 shows the diagram obtained by plotting coercive force (Hc) of the hexagonal plate-like barium ferrite particles obtained by thermal treatment in air at 600° C. for 2 hours of the specimen of $BaFe_{12-x-y}Co_x Ti_y O_{19}$ wherein x and y are as defined above, having a BET specific surface area (S) of 40 to 60 m$^2$/g against the value of x, the BET specific surface area (S) and magnetization (M) of the hexagonal plate-like barium ferrite particles being 30 to 50 m$^2$/g and 43 to 45 emu/g, respectively. As is clearly seen in FIG. 8, it is possible to control the coercive force (Hc) in a range of from 500 to 1000 Oe by adjusting the value of x to a range of from 0.6 to 1.2.

The hexagonal plate-like barium ferrite particles of $BaFe_{12-x-y}M_x Ti_y O_{19}$ wherein x, y and M are as defined above, obtained according to the present invention are easily oriented by pressing or applying, resulting in the increased value of coercive force (Hc).

The present invention will be explained more in detail while referring to the non-limitative Examples and Comparative Examples as follows.

In addition, the specific surface area (S) of the hexagonal plate-like barrium ferrite particles in Examples was measured according to BET method while using N$_2$ gas; the magnetization (M) of the hexagonal plate-like barium ferrite particles was measured in the magnetic field of 10 KOe and the coercive force (Hc) of the hexagonal plate-like barium ferrite particles was measured at a packing density of 1.6 g/cm$^3$.

EXAMPLE 1

Into 20 liters, of decarbonized water in an autoclave, 14 mols of Fe(NO$_3$)$_3$, 0.807 mol of Co(NO$_3$)$_2$, 0.807 mol of TiCl$_4$, 1.76 mols of Ba(OH)$_2$. 8H$_2$O and 165 mols of NaOH were added, and after heating the thus formed mixture to 270° C., the mixture was kept for 5 hours at the temperature while mechanically stirring the mixture, thereby forming a ferromagnetic precipitate of yellowish-brown in colour.

After cooling the reaction mixture to room temperature, the yellowish-brown ferromagnetic precipitate was collected by filtration, washed throughly with water and dried.

The thus obtained yellowish-brown ferromagnetic particles were identified as $BaFe_{10.76}Co_{0.62}Ti_{0.62}O_{19}$ as a result of fluorescent X-ray analysis, and the yellowish-brown ferromagnetic particles showed the following properties: specific surface area (S) of 46 m$^2$/g, magnetization (M) of 28 emu/g and coercive force (Hc) of 368 Oe.

Thereafter, the yellowish-brown ferromagnetic particles were treated with aqueous 0.5M acetic acid containing 5% by weight of water glass, and after collecting by filtration and drying, the dried particles were subjected to the thermal treatment in air at 800° C.

The thus obtained ferromagnetic particles of $BaFe_{10.76}Co_{0.62}Ti_{0.62}O_{19}$ showed a specific surface area (S) of 43 m$^2$/g, a magnetization (M) of 47 emu/g and a coercive force of 750 Oe.

In addition, according to the electronmicroscopic observation, the ferromagnetic particles were hexagonal plate-like particles having uniform in particle size and width of the particle of 0.2 to 0.4 micrometer.

EXAMPLE 2

Into 20 liters of decarbonized water in an autoclave, 14 mols of $Fe(NO_3)_3$, 1.235 mols of $Co(NO_3)_2$, 1.235 mols of $TiCl_4$, 1.75 mols of $Ba(OH)_2.8H_2O$ and 169 mols of NaOH were added, and after heating the thus formed mixture to 300° C., the thus heated mixture was treated in the same manner as in Example 1 to form yellowish-brown ferromagnetic particles.

The thus obtained yellowish-brown ferromegnetic particles were identified as $BaFe_{10.20}Co_{0.90}Ti_{0.90}O_{19}$ as a result of fluorescent X-ray analysis, and the yellowish-brown ferromagnetic particles showed a specific surface area (S) of 52 m$^2$/g, a magnetization (M) of 33.4 emu/g and a coercive force (Hc) of 115 Oe.

Thereafter, the thus obtained ferromagnetic particles were subjected to Si(IV)-treatment and then subjected to thermal treatment in the same manner as in Example 1 to obtain ferromagnetic particles of $BaFe_{10.20}Co_{0.90}Ti_{0.90}O_{19}$ showing a specific surface area (S) of 46 m$^2$/g, a magnetization (M) of 51 emu/g and a coercive force (Hc) of 570 Oe.

In addition, according to the electronmicroscopic observation, the ferromagnetic particles were hexagonal plate-like particles having uniform in particle size and width of the particle of 0.1 to 0.2 micrometer.

EXAMPLE 3

In the same manner as in Example 1 except for using 0.404 mol of Co(II) and 0.404 mol of Zn(II) as the divalent metal, a ferromagnetic precipitate of yellowish-brown in colour was formed, and the thus obtained yellowish-brown ferromagnetic particles were identified as $BaFe_{10.76}Co_{0.31}Zn_{0.31}Ti_{0.62}O_{19}$ as a result of fluorescent X-ray analysis, and the yellowish-brown ferromagnetic particles showed the following properties:

a specific surface area (S) of 43.3 m$^2$/g, a magnetization (M) of 35.5 emu/g and a coercive force (Hc) of 688 Oe.

Thereafter, the thus obtained yellowish-brown ferromagnetic particles were subjected to Si(IV)-treatment in the same manner as in Example 1 and then subjected to thermal treatment in air at 700° C.

The thus obtained ferromagnetic particles of $BaFe_{10.76}Co_{0.31}Zn_{0.31}Ti_{0.62}O_{19}$ showed a specific surface area (S) of 40 m$^2$/g, a magnetization (M) of 52 emu/g and a coercive force (Hc) of 960 Oe.

In addition, according to the electronmicroscopic observation, the ferromagnetic particles were hexagonal plate-like particles having uniform in particle size and width of the particle of 0.2 to 0.4 micrometer.

EXAMPLE 4

In the same manner as in Example 3 except for using Mn(II) instead of Zn(II) in Example 3, a ferromagnetic precipitate of yellowish-brown in colour was formed.

The thus obtained yellowish-brown ferromagnetic particles were identified as $BaFe_{10.76}Mn_{0.31}Co_{0.31}Ti_{0.62}O_{19}$ as a result of fluorescent X-ray analysis, and the yellowish-brown ferromagnetic particles showed the following properties:

a specific surface area (S) of 40.2 m$^2$/g, a magnetization (M) of 31.2 emu/g and a coercive force (Hc) of 580 Oe.

Thereafter, in the same manner as in Example 1, the thus obtained ferromagnetic particles were subjected to Si(IV)treatment, and then, subjected to thermal treatment in N$_2$ gas at 900° C.

The thus obtained ferromagnetic particles of $BaFe_{10.76}Mn_{0.31}Co_{0.31}Ti_{0.62}O_{19}$ showed a specific surface area (S) of 32 m$^2$/g, a magnetization (M) of 52 emu/g and a coercive force (Hc) of 985 Oe.

In addition, according to the electronmicroscopic observation, the ferromagnetic particles were hexagonal plate-like particles having uniform in particle size and width of the particle of 0.2 to 0.4 micrometer.

What is claimed is:

1. A process for producing hexagonal plate-like barium ferrite particles for magnetic recording, represented by the formula (I):

$$BaFe_{12-x-y}M_xTi_yO_{19} \qquad (I)$$

wherein x and y are independently 0.6 to 1.2 and M is Co(II) or Co(II) and a divalent metal of Fe(II), Zn(II) or Mn(II), having the width of said particle of 0.1 to 0.4 um and a BET specific surface area (S) of 30 to 50 m$^2$/g, and showing a magnetization (M) of larger than 40 emu/g in a magnetic field of 10 KOe and a coercive force (Hc) of 500 to 1000 Oe, which process comprising autoclaving an aqueous highly alkaline suspension of ferric hydroxide containing Ti(IV), Ba(II) and Co(II) and a divalent metal of Fe(II), Zn(II) or Mn(II) as M at a temperature in the range of from 250° to 330° C. tO form ferromagnetic hexagonal plate-like particles of the formula (I) wherein x, y and M are the same as defined above andhaving a width of said particles of 0.04 to 0.4 um, treating the thus obtained particles with an aqueous solution containing Si(IV), and subjecting the thus treated particles to thermal treatment at a temperature of 700° to 900° C.

2. A process according to claim 1, wherein the thermal treatment is carried out at a temperature of 700° to 850° C.

3. A process according to claim 1, wherein in the aqueous highly alkaline suspension the atomic ratIo of total sum of M and Ti(IV) to Fe(III) is 0.11:1 to 0.25:1.

4. A process according to claim 1, wherein ferric chloride, ferric nitrate or powdery ferric oxyhydroxide is used as a source of Fe(III).

5. A process according to claim 1, wherein barium hydroxide, barium nitrate or barium choride is used as a source of Ba(II).

6. A process according to claim 1, wherein cobalt nitrate or cobalt chloride is used as a source of Co(II).

7. A process according to claim 1, wherein titanium chloride of alkali titanate is used as a source of Ti(IV).

8. A process according to claim 1, wherein x is equal to y.

9. Hexagonal plate-like barium ferrite particles for magnetic recording, represented by the formula(I):

$$BaFE_{12-x-y}M_xTi_yO_{19} \qquad (I)$$

wherein x and y are idnependently 0.6 to 1.2 and M is Co(II) or Co(II) and a divalent metal of Fe(II), Zn(II) or Mn(II), having the width of the particle of 0.1 to 0.4 um and a BET specific surface area (S) of 30 to 50 m2/g, and showing a magnetization (M) of larger than 40 emu/g in a magnetic filed of 10 KOe and a coercive force (Hc) of 500 to 1000 Oe, produced by autoclaving an aqueous highly alkaline suspension of ferric hydroxide containing Ti(IV), Ba(II) and Co(II) or Co(II) and said divalent metal of Fe(II), Zn(II) or Mn(II) as M at a temperature in the range of from 250° to 330° C., thereby obtaining ferromagnetic hexagonal plate-like particles represented by the formula (I) wherein x,y and M are the same as defined above, having the width of said particles of 0.05 to 0.4 um, treating the thus obtained particles with an aqueous solution containing Si(IV) and subjecting the thus treated particles to thermal treatment at a temperature of 700° to 900° C.

10. Hexagonal plate-like barium ferrite particles according to claim 9, wherein the thermal treatment is carried out at temperature a 700° to 850° C.

11. Hexagonal plate-like barium ferrite particles according to claim 10, wherein the BET specific surface area thereof is in the range of 30 to 45 m$^2$/g.

12. Hexagonal plate-like barium ferrite particles according to claim 10, wherein the width of the particle is in the range of 0.1 to 0.3 micrometer.

13. Hexagonal plate-like barium ferrite particles according to claim 10, wherein the coercive force (Hc) is in the range of 600 to 900 Oe.

14. Hexagonal plate-like barium ferrite particles according to claim 10, wherein x is equal to y.

15. Hexagonal plate-like barium ferrite particles according to claim 10, wherein in the aqueous highly alkaline suspension the atomic ratio of total sum of M and Ti(IV) to Fe(III) is 0.11:1 to 0.25:1.

* * * * *